(12) United States Patent
Brown et al.

(10) Patent No.: US 10,487,868 B2
(45) Date of Patent: Nov. 26, 2019

(54) LIGHTWEIGHT CONNECTING ROD WITH TAILORED STIFFNESS

(71) Applicant: GM Global Technology Operations LLC, Detroit, MI (US)

(72) Inventors: Tyson W. Brown, Royal Oak, MI (US); Anil K. Sachdev, Rochester Hills, MI (US); Alin C. Dragoiu, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/421,917

(22) Filed: Feb. 1, 2017

(65) Prior Publication Data
US 2018/0216658 A1   Aug. 2, 2018

(51) Int. Cl.
*F02B 75/32* (2006.01)
*F16C 7/02* (2006.01)

(52) U.S. Cl.
CPC .............. *F16C 7/023* (2013.01); *F02B 75/32* (2013.01); *F16C 2220/24* (2013.01)

(58) Field of Classification Search
CPC ................................ F16C 7/023; F02B 75/32
USPC ........................... 123/197.3, 197.4; 74/579 R
See application file for complete search history.

(56) References Cited

U.S. PATENT DOCUMENTS

| | | | | |
|---|---|---|---|---|
| 1,373,083 A | * | 3/1921 | Layman | F16C 7/023 74/588 |
| 2,428,602 A | * | 10/1947 | Yingling | F16C 9/04 74/579 E |
| 2,926,975 A | * | 3/1960 | Karde | F16J 1/22 92/157 |
| 3,431,796 A | * | 3/1969 | Valbjorn | F16J 1/14 74/587 |
| 3,482,467 A | * | 12/1969 | Volkel | F16C 7/023 74/579 R |

(Continued)

FOREIGN PATENT DOCUMENTS

| | | |
|---|---|---|
| CN | 108374704 A | 8/2018 |
| CN | 108374830 A | 8/2018 |

(Continued)

OTHER PUBLICATIONS

Brown et al., U.S. Appl. No. 15/421,795, filed Feb. 1, 2017 entitled "Mass-Efficient Rocking Component" 41 pages.

*Primary Examiner* — Long T Tran
*Assistant Examiner* — James J Kim
(74) *Attorney, Agent, or Firm* — Harness, Dickey & Pierce, P.L.C.

(57) ABSTRACT

In various aspects, a lightweight connecting rod for an internal combustion engine is provided. The lightweight connecting rod has one or more of: hollow regions, lattice regions, or weight reduction apertures. The connecting rod may be made via an additive manufacturing process. The connecting rod includes a first end, a second end, and an arm. The first end is configured to be pivotally connected to a piston. The second end is configured to be pivotally connected to a crankshaft. The arm extends between the first end and the second end. The arm includes a peripheral wall. The peripheral wall has an outer surface, an inner surface, and an interior region. The interior region is defined be the inner surface. The interior region includes at least one void space. The void space is a lattice structure or a hollow region.

19 Claims, 6 Drawing Sheets

(56) References Cited

U.S. PATENT DOCUMENTS

Figure 1A:
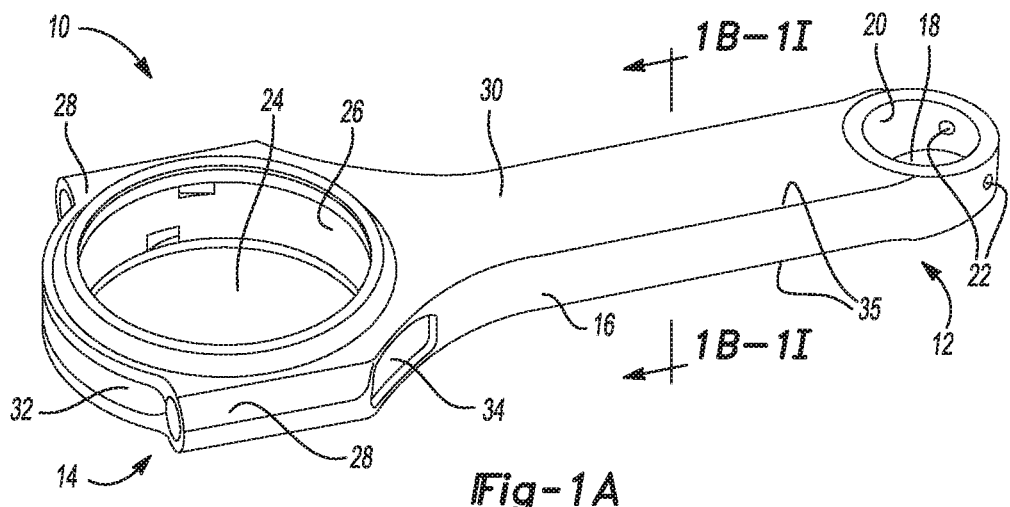

| | | | | |
|---|---|---|---|---|
| 3,482,468 | A | * | 12/1969 | De Biasse ............... F16C 7/023 74/579 R |
| 4,440,121 | A | | 4/1984 | Clancy et al. |
| 4,589,383 | A | | 5/1986 | Showalter |
| 4,674,453 | A | | 6/1987 | Dove, Jr. |
| 4,784,095 | A | | 11/1988 | Golding et al. |
| 4,944,257 | A | | 7/1990 | Mills |
| 5,048,368 | A | * | 9/1991 | Mrdjenovich ......... B22D 25/02 164/516 |
| 5,060,606 | A | | 10/1991 | Hubbard |
| 5,063,889 | A | | 11/1991 | Pryba et al. |
| 5,140,869 | A | * | 8/1992 | Mrdjenovich ......... B22D 25/02 74/579 E |
| 5,370,093 | A | * | 12/1994 | Hayes ..................... F16C 7/023 123/197.4 |
| 6,227,156 | B1 | | 5/2001 | Autrey et al. |
| 8,720,410 | B2 | * | 5/2014 | Schubert ................. F02B 41/04 123/197.1 |
| 10,145,271 | B2 | | 12/2018 | Brown et al. |
| 2002/0096013 | A1 | | 7/2002 | Cutshall et al. |
| 2004/0154578 | A1 | * | 8/2004 | Weaver ................. F01M 11/02 123/197.3 |
| 2005/0014060 | A1 | | 1/2005 | Suzuki |
| 2006/0283287 | A1 | | 12/2006 | Pankl |
| 2007/0044745 | A1 | | 3/2007 | Smith |
| 2007/0261514 | A1 | * | 11/2007 | Geiman .................. B22F 5/008 74/579 R |
| 2008/0282838 | A1 | * | 11/2008 | Weaver .................. F01M 11/02 74/579 E |
| 2009/0000579 | A1 | | 1/2009 | Rozario et al. |
| 2012/0031227 | A1 | * | 2/2012 | De Souza ............... F16C 7/023 74/579 E |
| 2015/0053169 | A1 | * | 2/2015 | Galli ....................... F16C 7/023 123/197.3 |
| 2016/0061067 | A1 | | 3/2016 | Schultheis et al. |
| 2017/0136697 | A1 | | 5/2017 | Kia et al. |
| 2017/0136698 | A1 | | 5/2017 | Kia et al. |
| 2017/0211168 | A1 | | 7/2017 | Liu et al. |
| 2017/0363040 | A1 | | 12/2017 | Brown et al. |
| 2018/0045082 | A1 | | 2/2018 | Foster et al. |
| 2018/0200835 | A1 | | 7/2018 | Chae et al. |
| 2018/0216501 | A1 | | 8/2018 | Brown et al. |

FOREIGN PATENT DOCUMENTS

| | | | | |
|---|---|---|---|---|
| DE | 3708760 | A1 | * 9/1988 | ............ B22D 19/14 |
| DE | 102018102075 | A1 | 8/2018 | |
| DE | 102018102076 | A1 | 8/2018 | |
| JP | 60257938 | A | * 12/1985 | ............ B21D 53/84 |

* cited by examiner

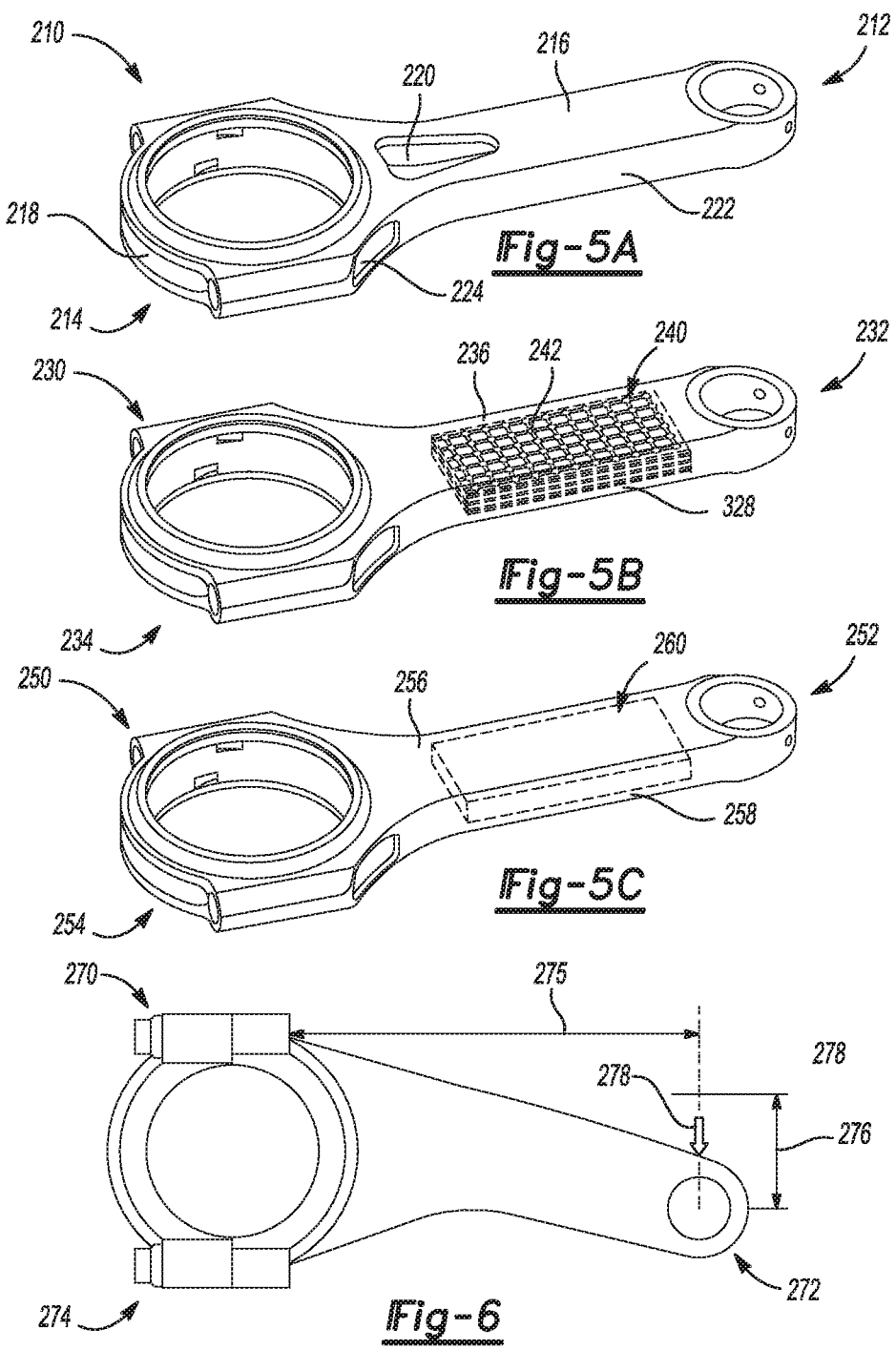

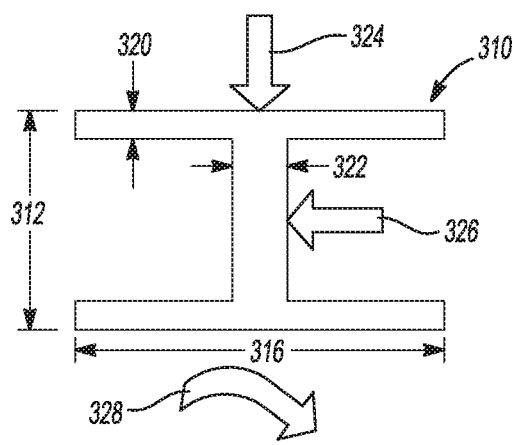
*Fig-7A*
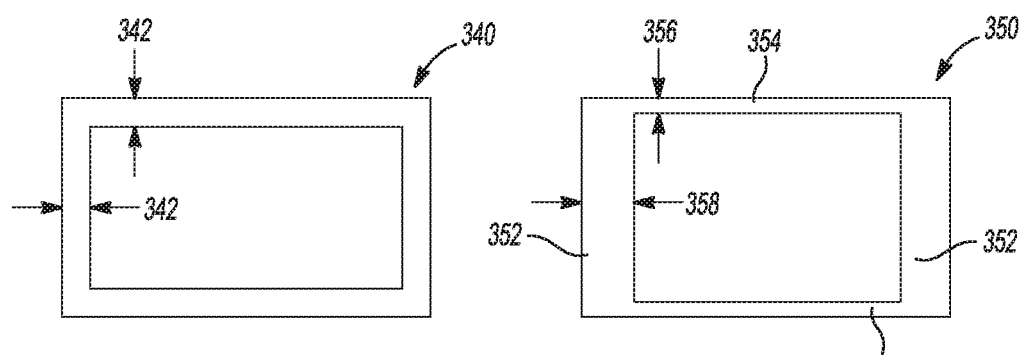
*Fig-7B*  *Fig-7C*
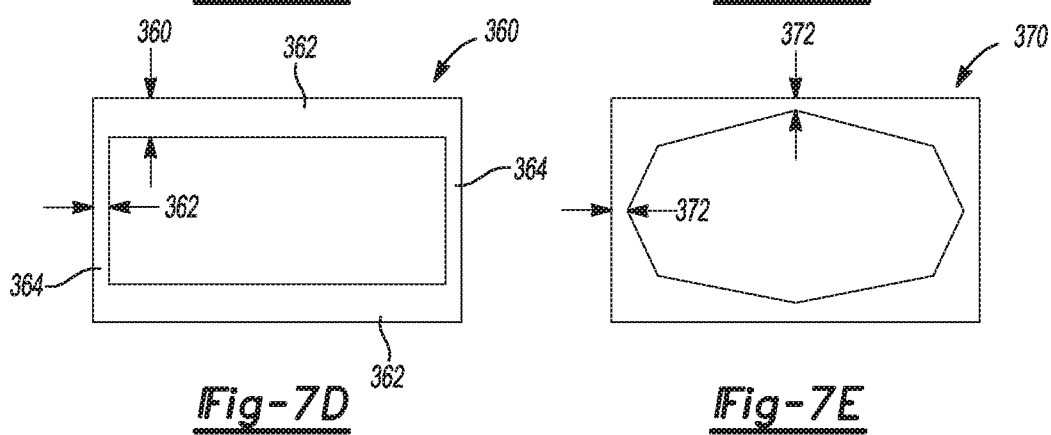
*Fig-7D*  *Fig-7E*

LIGHTWEIGHT CONNECTING ROD WITH TAILORED STIFFNESS

INTRODUCTION

This section provides background information related to the present disclosure which is not necessarily prior art.

Connecting rods are used in internal combustion engines to covert the reciprocating motion of pistons into rotary motion. More specifically, a connecting rod links a piston to a crankshaft. As a piston moves down on a power stroke, the connecting rod acts upon the crankshaft to cause it to rotate. In a vehicle, the end of the crankshaft is connected to the transmission. Weight reduction in vehicle components is important in increasing fuel economy. However, vehicle components must also exhibit high strength and stiffness. Connecting rods should be designed to be strong, and as light as possible.

SUMMARY

This section provides a general summary of the disclosure, and is not a comprehensive disclosure of its full scope or all of its features.

The present disclosure relates to lightweight connecting rods for internal combustion engines with tailored stiffness, and more specifically to lightweight connecting rods having one or more of: hollow regions, lattice regions, or weight reduction apertures.

In various aspects, the present disclosure provides a connecting rod for an internal combustion engine. The connecting rod includes a first end, a second end, and an arm. The first end is configured to be pivotally connected to a piston. The second end is configured to be pivotally connected to a crankshaft. The arm extends between the first end and the second end. The arm includes a peripheral wall. The peripheral wall has an outer surface, an inner surface, and an interior region. The interior region is defined be the inner surface. The interior region includes at least one void space. The void space is a lattice structure or a hollow region.

In certain embodiments, the void space includes a lattice structure including a plurality of cells formed via additive manufacturing, casting, or weldment.

In certain embodiments, the peripheral wall includes at least one thickened region.

In certain embodiments, the outer surface defines a substantially rectangular cross section. The inner surface defines a substantially octagonal cross section.

In certain embodiments, the arm further includes one or more apertures.

In certain embodiments, the arm further includes a first portion and a second portion. The first portion is adjacent to the first end. The first portion includes a substantially uniform first width. The second portion is adjacent to the second end. The second portion includes the first width adjacent to the first portion of the arm and a second width adjacent to the second end of the connection rod. The second width is greater than the first width. A width of the second portion increases between the first width and the second width.

In certain embodiments, the second width is greater than or equal to about 2 times the first width and less than or equal to about 5 times the first width.

In certain embodiments, the connecting rod has a tensile strength of greater than or equal to about 150 MPa.

In various aspects, the present disclosure provides a connecting rod for an internal combustion engine. The connecting rod includes an arm extending between a first end and a second end. The first end is configured to pivotally connect to a piston. The second end is configured to pivotally connect to a crankshaft. The arm includes at least one interior region. The interior region includes at least one void space. The void space includes a lattice structure having a plurality of cells formed via additive manufacturing, casting, or weldment.

In certain embodiments, the arm includes a first stiffness in a first region and a second stiffness in a second region. The second stiffness is distinct from the first stiffness.

In certain embodiments, the lattice structure includes a first density in a first region and a second density in a second region. The second density is distinct from the first density.

In certain embodiments, the connecting rod also includes a peripheral wall disposed around the lattice structure. The peripheral wall includes at least one thickened region.

In certain embodiments, the peripheral wall includes an outer surface defining a substantially rectangular cross section. The at least one thickened region includes four thickened regions disposed at respective corners of the rectangular cross section.

In certain embodiments, the arm also includes one or more apertures.

In various aspects, the present disclosure provides a connecting rod for an internal combustion engine. The connecting rod includes a first end, a second end, and an arm. The first end is configured to be pivotally connected to a piston. The second end is configured to be pivotally connected to a crankshaft. The arm extends between the first end and the second end. The arm includes a first portion and a second portion. The first portion is adjacent to the first end. The first portion has a substantially uniform first width. The second portion is adjacent to the second end. The second portion includes the first width adjacent to the first portion of the arm and a second width adjacent to the second end of the connecting rod. The second width is greater than the first width. A width of the second portion linearly increases between the first width and the second width. The second width is greater than or equal to about 2 times the first width and less than about 5 times the first width. The arm also includes an outer surface and an inner surface. The inner surface defines an interior region.

In certain embodiments, the outer surface of the arm and the inner surface of the arm define a peripheral wall having at least one thickened region.

In certain embodiments, the inner surface includes eight (8) faces and defines a substantially octagonal cross section.

In certain embodiments, the outer surface defines a substantially elliptical cross section.

In certain embodiments, the interior region includes a lattice structure including a plurality of cells formed via additive manufacturing, casting, or weldment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figures 1B, 1C, 1D, 1E:
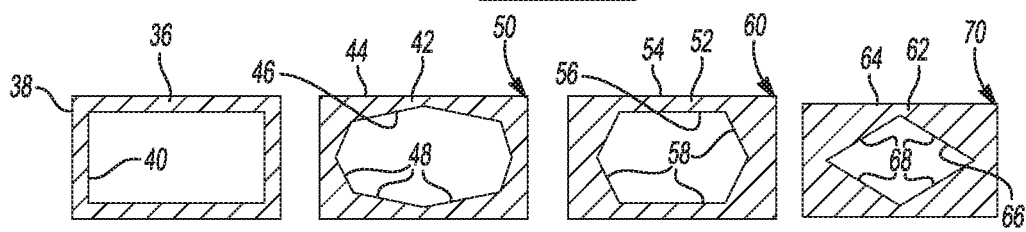
Figures 1F, 1G, 1H, 1I:
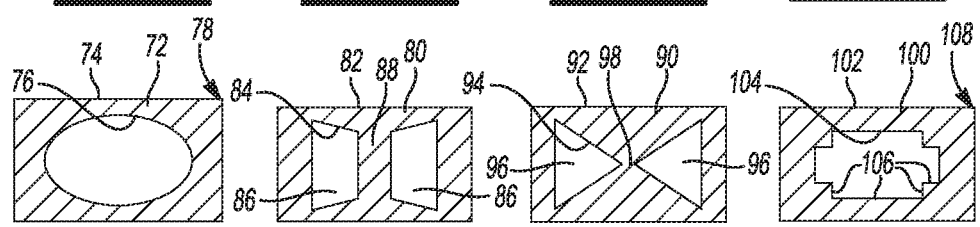
Figures 2A, 2B:
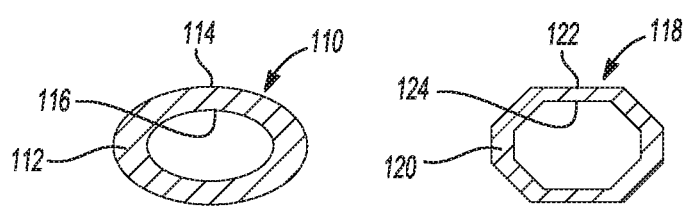
Figure 3A:
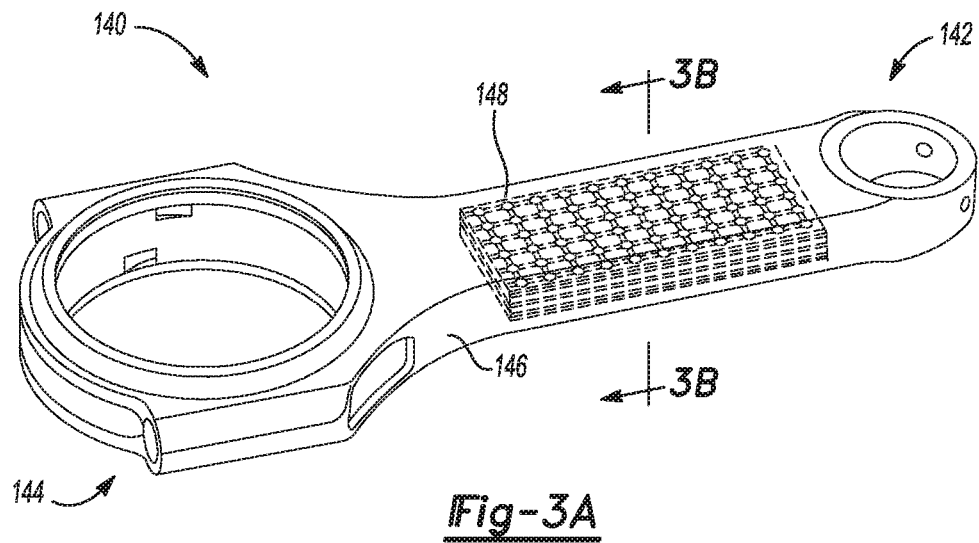
Figure 3B:
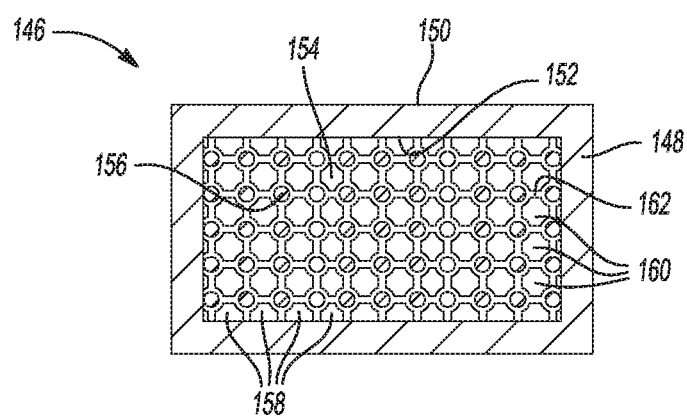
Figure 4A:
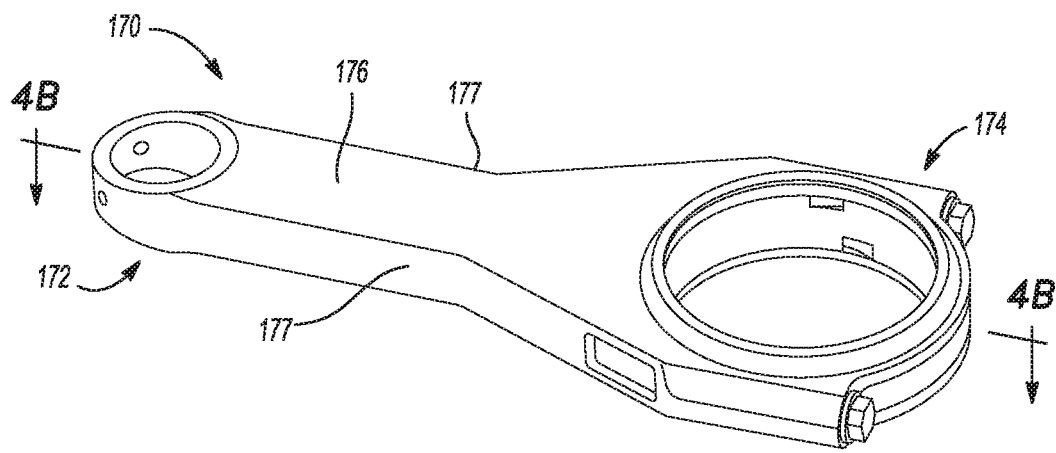
Figure 4B:
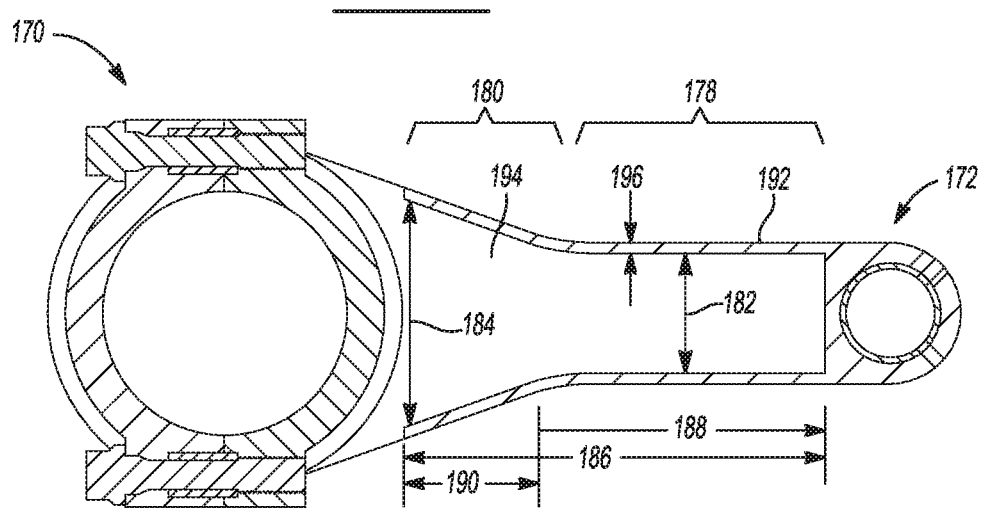
Figure 4C:
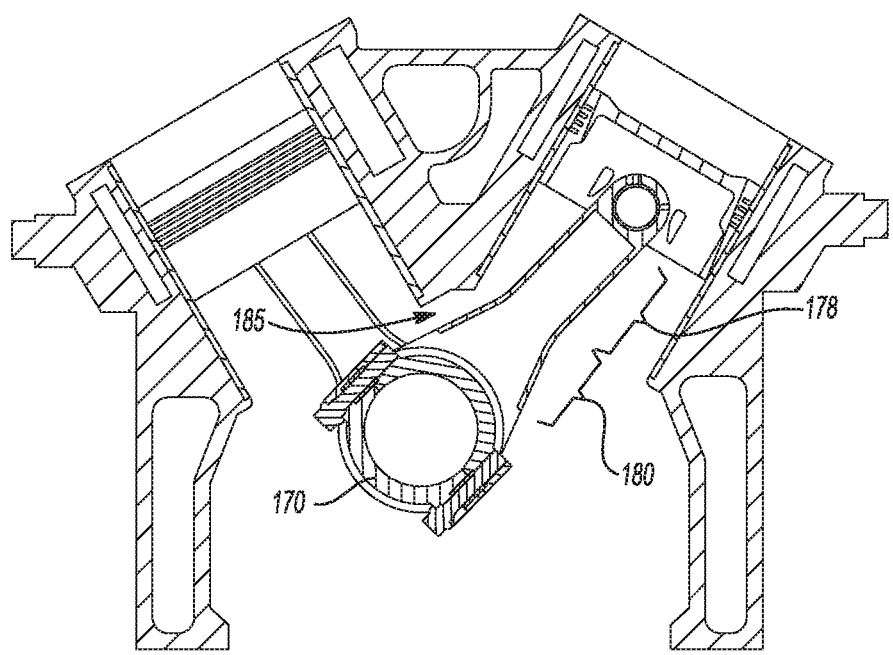

FIGS. 1A-1I show connecting rods according to certain aspects of the present disclosure. FIG. 1A is a perspective view of a connecting rod according to certain aspects of the present disclosure. FIGS. 1B-1I are alternative cross sectional views of an arm of the connecting rod taken at line 1B-1I-1B-1I according to certain aspects of the present disclosure. FIG. 1B depicts a rectangular cross section having a uniform wall thickness; FIG. 1C depicts an octagonal cross section; FIG. 1D depicts a hexagonal cross section; FIG. 1E depicts a diamond-shaped cross section; FIG. 1F depicts an elliptical cross section; FIG. 1G depicts a cross section having two trapezoidal channels; FIG. 1H depicts a cross section having two triangular channels; FIG. 1I depicts a cross section having a complex geometry;

FIGS. 2A-2B are alternative cross sectional views of a non-rectangular arm of a connecting rod. FIG. 2A depicts an arm having an elliptical outer surface an elliptical inner surface; FIG. 2B depicts an arm having an octagonal outer surface and an octagonal inner surface;

FIGS. 3A-3B show a connecting rod having an interior portion including a lattice structure according to certain aspects of the present disclosure. FIG. 3A shows a perspective view of the connecting rod; FIG. 3B is a cross section of an arm of the connecting rod of FIG. 3A taken at line 3B-3B;

FIGS. 4A-4C show a connecting rod having widened sections according to certain aspects of the present disclosure. FIG. 4A is a perspective view of the connecting rod; FIG. 4B is a cross sectional view of the connecting rod taken at line 4B-4B; FIG. 4C is a partial cross sectional view of an internal combustion engine including the connecting rod of FIG. 4A;

FIGS. 5A-5C show a lightweight connecting rod according to certain aspects of the present disclosure. FIG. 5A is a perspective view of a connecting rod having weight reduction apertures; FIG. 5B is a perspective view of a connecting rod having an interior region including a lattice structure; FIG. 5C is a perspective view of a connecting rod having a hollow interior region;

FIG. 6 shows a schematic of deflection testing of a cantilevered connecting rod; and FIGS. 7A-7E show cross sections of arms of cantilevered connecting rods for testing deflection levels for different cross sections. FIG. 7A depicts an I-beam cross section; FIG. 7B depicts a rectangular cross section with a uniform wall thickness; FIG. 7C depicts a rectangular cross section with thickened side walls; FIG. 7D depicts a rectangular cross section with thickened top and bottom walls; and FIG. 7E depicts an octagonal cross section.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Commercial connecting rods may be forged from high-strength steel. They may also be made of nodular steel or cast iron. Connecting rods may be manufactured by pressing a metal powder into a green part. The green part is then sintered and then forged. The forged connecting rod may be further machined to include geometry such as holes or grooves to form I-beams. I-beam cross sections can be used to improve stiffness and reduce weight.

In various aspects, the present disclosure provides a connecting rod for an internal combustion engine having decreased mass, increased stiffness, or both decreased mass and increased stiffness. In certain embodiments, localized stiffness may be increased. In certain embodiments, at least one region of the connecting rod defines a hollow interior region. The region may be an internal region of an arm that connects first and second ends of the connecting rod. In certain aspects, the present disclosure provides a connecting rod having at least one region defining a lattice structure that may be an internal region of an arm of the connecting rod. The lattice structure generally includes a plurality of cells that form a repeating structure. In still other aspects, the present disclosure provides a connecting rod having one or more weight reduction apertures. In various aspects, the connecting rods of the present disclosure are formed by an additive manufacturing process.

Additive manufacturing is a process by which a solid three-dimensional structure is built layer-by-layer, typically via a printing deposition process or where energy or heat is selectively applied to powder starting materials to solidify, fuse, or sinter and create a layer of solid material. Additive manufacturing is often referred to synonymously with three-dimensional printing. Either polymers or metals may be used to create solid structures via additive manufacturing. Non-limiting examples of additive manufacturing processes include fused deposition modeling and selective laser sintering with polymers, such as thermosets and thermoplastics; stereolithography, continuous liquid interface production technology, or other technologies that rely on UV curable polymers; fused deposition modeling with composite polymers; direct metal laser sintering, electron beam direct metal melting systems, blown powder directed energy deposition, wire-fed directed energy deposition, and liquid metal 3D printing system with "MagnetJet" technology with metals, such as aluminum alloys, titanium alloys, and alloyed steel. Moreover, a plurality of materials may be deposited at different locations of an object being built by a single machine A digital three-dimensional modeling system can be used to create a digital model of the structure to be formed. The physical structure can then be formed from the digital model by an additive manufacturing system. The system may include scanners that survey a structure's surface and develops a three-dimensional map of the structure's surface geometry. The system also provides a plurality of heads for depositing resins and/or fibers on structure surfaces. In various embodiments, the system is provided as a plurality of devices or as a single multi-functional device.

Referring to FIG. 1A, a connecting rod 10 formed via an additive manufacturing process according to certain aspects of the present disclosure is provided. The connecting rod 10 includes a first or small end 12 configured to be pivotally connected to a piston (not shown) and a second or large end 14 configured to be pivotally connected to a crankshaft (not shown). An arm 16 extends between the first end 12 and the second end 14.

The first end 12 includes a small hole or passage 18 defined by an inner surface 20. The inner surface 20 may include one or more oil passages 22. The second end 14 includes a large hole or passage 24 defined by an inner surface 26. The second end 14 may include oil holes or passages in the inner surface 26, similar to the oil holes or passages 22 in the inner surface 20 of the first end 12. The second end 14 may further include two barrel portions 28 disposed on opposite sides of the large hole 24. The barrel portions 28 are substantially parallel with the arm 16. The barrel portions 28 are configured to receive bolts to assemble the second end 14 to the crankshaft (not shown). The connecting rod 10 includes an outer surface 30. The second end 14 may include one or more grooves 32 extending into the outer surface 30. The grooves 32 contribute to weight reduction of the connecting rod 10.

The connecting rod 10 may further include one or more powder removal holes 34. The powder removal holes 34 may be used to remove residual powder from interior portions of the connecting rod 10 after additive manufacturing is complete. Powder removal holes 34 may be provided in other surfaces of the connecting rod 10, for example, in the inner surface 20 of the first end 12, the inner surface 26 of the second end 14, or surfaces 35 of the arm 16. In certain variations, powder removal holes may be welded shut or otherwise removed after additive manufacturing.

The connecting rod 10 also includes an inner surface defining an interior region (both shown in FIGS. 1B-1I). The interior region is fully enclosed and includes one or more voids. A void may include a hollow region or a lattice structure formed via an additive manufacturing process. The interior region may be disposed within at least a portion of the arm 16, for example. Referring now to FIGS. 1B-1I, various cross section geometries for the arm 16 are provided as non-limiting examples. Each of arm cross section in FIGS. 1B-1I includes an outer surface that defines a rectangular outer cross section. Thus, as used in the following description, "corner" refers to the edges of the outer surface where the sides of the arm come together at substantially right angles. Although the arm 16 shown includes sharp or defined edges, the edges may be other geometries within the present disclosure. For example, the edges may be rounded. Rounded edges may be particularly advantageous in reducing drag of the connecting rod as it reciprocates through an oil mist at significant velocities in an internal combustion engine. Rounded edges may also be particularly advantageous in reducing stress concentration at the corners and improving fatigue life.

In certain variations, the interior region of the connecting rod 10 is surrounded by a peripheral wall having a uniform thickness. The connecting rod may have an outer surface that forms one cross section, such as a rectangle, and an inner surface that forms the same shape or a distinct shape. The cross section of FIG. 1B includes a rectangular peripheral wall 36 extending between an outer surface 38 and an inner surface 40. The peripheral wall 36 has a uniform thickness. Both the outer surface 38 and the inner surface 40 define rectangular cross sections.

In certain other variations, the interior region of the connecting rod 10 defines a channel having a polygonal cross section. FIG. 1C includes a peripheral wall 42 extending between an outer surface 44 and an inner surface 46. The inner surface 46 includes eight (8) faces 48 defining an octagonal cross section. The peripheral wall 42 is thickest at the corners 50. FIG. 1D includes a peripheral wall 52 extending between an outer surface 54 and an inner surface 56. The inner surface 56 includes six (6) faces 58 defining a hexagonal cross section. The peripheral wall 52 is thickest at the corners 60. FIG. 1E includes a peripheral wall 62 extending between an outer surface 64 and an inner surface 66. The inner surface 66 includes four (4) faces 68 defining a diamond cross section. The peripheral wall 62 is thickest at the corners 70. Polygonal cross sections according to certain aspects of the present disclosure are not limited to the shapes disclosed herein. Polygonal channel cross sections may have other numbers of faces, such as three (3), five (5), seven (7), nine (9), or ten (10), by way of non-limiting example. Although the polygonal cross sections shown are symmetrical about at least two axes, asymmetric cross sections are also contemplated.

In still other variations, the interior region of the connecting rod 10 has a circular or elliptical cross section. FIG. 1F includes a peripheral wall 72 extending between an outer surface 74 and an inner surface 76. The inner surface 76 define an elliptical cross section. The peripheral wall 72 is thickest at the corners 78.

In further variations, the interior region of the connecting rod 10 includes two (2) or more channels or compartments. FIG. 1G includes a peripheral wall 80, an outer surface 82, and an inner surface 84. The inner surface 84 defines first and second channels 86, each channel 86 having a trapezoidal cross section. A wall 88 extends between the two channels 86. FIG. 1H includes a peripheral wall 90, an outer surface 92, and an inner surface 94. The inner surface 94 defines first and second channels 96, each channel 96 having a triangular cross section. A wall 98 extends between the channels 96. Although the cross sections shown each include two channels, other numbers of channels are contemplated within the present disclosure. By way of non-limiting example, an interior region may include three (3) or four (4) channels.

In still other variations, the interior region of the connecting rod has a complex geometry. FIG. 1I includes a peripheral wall 100 extending between an outer surface 102 and an inner surface 104. The inner surface 104 includes a plurality of faces 106 defining a complex cross section. The peripheral wall 100 is thickest at the corners 108. Other complex geometries are contemplated within the present disclosure. Interior regions may have cross sections with rounded corners, flats, and asymmetry, by way of non-limiting example.

Referring now to FIGS. 2A-2B, a connecting rod (not shown) may include an arm having an outer surface that defines a non-rectangular cross section. For example, in FIG. 2A, an arm 110 includes a peripheral wall 112 extending between an outer surface 114 and an inner surface 116. The outer surface wall 112 and the inner surface 114 each define an elliptical cross section. The peripheral wall 112 has a uniform thickness. Referring to FIG. 2B, an arm 118 includes a peripheral wall 120 extending between an outer surface 122 and an inner surface 124. The outer surface 122 and the inner surface 124 each define an octagonal cross section. Other combinations of inner and outer surface cross sections are contemplated within the present disclosure. By way of non-limiting example, any of the inner surface cross sections of FIGS. 1B-1I could be used in combination with the outer surface cross sections of FIGS. 2A-2B.

In various aspects, the present disclosure provides a connecting rod having one or more interior regions having lattice structures. With reference to FIGS. 3A-3B, a connecting rod 140 is provided. The connecting rod 140 includes a first or small end 142, a second or large end 144, and an arm 146 extending between the first end 142 and the second end 144. The first end 142, second end 144, and arm 146 may be similar to the first end 12, second end 14, and arm 16 of FIG. 1A.

As best shown in FIG. 3B, the arm 146 includes a peripheral wall 148 having an outer surface 150, an inner surface 152, and an interior region 154 defined by the inner surface 152. The peripheral wall 148, the inner surface 152, and the interior region 154 may have similar cross sections to those discussed in conjunction with FIGS. 1B-1I and 2A-2B.

The interior region 154 may include a lattice structure 156. The lattice structure 156 includes a plurality of cells 158. The plurality of cells may be regularly repeated within the lattice structure 156, as shown. In some embodiments, the cells may vary in shape, size, or material throughout the lattice structure 156, as discussed in greater detail below. The lattice structure 156 includes one or more open or void regions 160 where solid structures are absent. The void regions 160 may occupy a contiguous substantial volume of the cell 158. Thus, the lattice structure 156 may result in a reduction in volume and weight when compared to a solid structure. The void regions 160 may be surrounded by a material web 162.

The density of the lattice structure 158 may be varied throughout to create regions of greater levels of strength corresponding to higher density as compared to regions of lower density with relatively less strength. Thus, the present disclosure provides connecting rods having localized tailored stiffness. Areas of the connecting rod 140 that experience relatively higher stress include the arm 146 adjacent to the small end 142, by way of non-limiting example. Thus, a higher density lattice structure 156 may be provided in the above regions.

In certain variations, density of the lattice structure 156 may be varied by increasing or decreasing the volume of the void regions 160. Thus, a region of a connecting rod that experiences higher stresses may have a relatively low volume of voids 160 and a relatively high volume of material 162. Conversely, a region of a connecting rod that experiences lower stresses has a relatively high volume of voids 160 and a relatively low volume of material 162.

In certain other variations, the volume occupied by the voids 160 of the lattice structure 156 may be relatively uniform throughout the lattice structure 156. Higher strength regions may be created by use of two materials, a first lower strength material in the low stress regions and a second higher strength material in the high stress regions.

In various aspects, a connecting rod having an arm with strategically widened regions for increased stiffness is provided. With reference to FIGS. 4A-4B, a connecting rod 170 is shown. The connecting rod 170 includes a first or small end 172, a second or large end 174, and an arm 176 extending between the first end 172 and the second end 174. The first end 172, second end 174, and arm 176 may be similar to the first end 12, second end 14, and arm 16 of FIG. 1A.

The arm 176 includes a first portion 178 adjacent to the first end 172 and a second portion 180 adjacent to the second end 174. The first portion 178 has a first width 182 that is substantially uniform throughout the first portion 178. The second portion 180 is disposed intermediate the first portion 178 and the second end 174. The second portion 180 has the first width 182 adjacent to the first portion 178 and a second distinct width 184 adjacent to the second end 174. The second width 184 is greater than the first width 182. A width of the second portion 180 increases between the first width 182 and the second width 184. The width of the second portion 180 may increase linearly, as shown. Alternatively, the width may increase nonlinearly. In certain embodiments, opposing sides 177 of the arm 176 may have different profiles.

The first width may be greater than or equal to about 2 times the first width 182 and less than or equal to about 5 times the first width, optionally about 3 times the first width. With reference to FIG. 4C, the second width 184 is limited by the geometry of a bottom region of a cylinder 185 in an internal combustion engine.

The arm 176 may have a total length 186. The first portion 178 may have a first length 188 and the second portion 180 may have a second length 190. The sum of the first and second lengths 188, 190 is equal to the total length 186. The first length 188 may be greater than or equal to 0 and less than or equal to about 5 times the second length 190, optionally about 3 times the second length 190. In some variations, the first length 188 and the second length 190 may be approximately equal.

The connecting rod 170 may include a peripheral wall 192 surrounding an interior region 194 that may be hollow or may comprise a lattice structure. The peripheral wall 192 includes a thickness 196. The thickness 196 may be substantially uniform. In some embodiments, the thickness 196 is not uniform The thickness may be greater than or equal to about 0.5 millimeters and less than or equal to about 3 millimeters. The interior region 194 enables the inclusion of the widened second portion 180 with a minimal increase in mass. The widened second portion 180 has the advantageous characteristic of increased stiffness with a minimal increase in mass.

In various aspects, the present disclosure provides a connecting rod having a reduced mass when compared to connecting rods having a solid I-beam arm construction. Referring to FIG. 5A, a connecting rod 210 is provided. The connecting rod 210 includes a first or small end 212, a second or large end 214, and an arm 216. The first end 212, second end 214, and arm 216 may be similar to the first end 12, second end 14, and arm 16 of FIG. 1A. The connecting rod 210 may be provided with one or more weight reduction features. For example, the connecting rod 210 may include a groove 218 formed primarily in the second portion 214. The connecting rod 210 may also include one or more weight reduction apertures 220 provided in the arm 216. The connecting rod 210 may also include additional weight reduction apertures (not shown) in a side surface 222 of the arm 216. In certain variations the connecting rod 210 may include one or more powder removal apertures 224 that can remain in the connecting rod 210 after manufacturing to serve as weight reduction apertures. The connecting rod 210 may have a solid construction, or it may have one or more interior compartments include one or more voids. The voids may define a hollow interior or a lattice structure, as shown in FIGS. 1A-1I and FIGS. 3A-3B, respectively.

With reference to FIG. 5B, another connecting rod 230 is provided. The connecting rod includes a first or small end 232, a second or large end 234, and an arm 236 extending between the first end 232 and the second end 234. The first end 232, second end 234, and arm 236 may be similar to the first end 12, second end 14, and arm 16 of FIG. 1A.

The arm 236 includes a peripheral wall 238 surrounding an interior region 240. The interior region 240 includes a lattice structure 242, similar to the lattice structure 156 shown in FIG. 3B. The lattice structure 242 enables the connecting rod 230 to have a lower mass than a connecting rod having a solid I-beam arm construction.

Referring to FIG. 5C, yet another connecting rod 250 is provided. The connecting rod 250 includes a first or small end 252, a second or large end 254, and an arm 256 extending between the first end 252 and the second end 254. The first end 252, second end 254, and arm 256 may be similar to the first end 12, second end 14, and arm 16 of FIG. 1A. The arm 256 includes a peripheral wall 258 surrounding an interior region 260. The interior region 260 is at least partially hollow. The hollow interior region 260 enables the connecting rod 250 to have a lower mass when compared to a connecting rod having a solid I-beam arm construction.

The features of the connecting rods 210, 230, 250 of FIGS. 5A-5B may be used separately or in combination. For example, a connecting rod may include an interior region having both hollow regions and lattice structure regions. In another example, a connecting rod may include weight reduction apertures and an interior region including both hollow and lattice regions.

In certain variations, a connecting rod may be formed from steel. A steel connecting rod having mass reduction features as described above may have a mass that is reduced when compared to a steel connecting rod having a solid I-beam arm construction. The reduction in mass due to geometry may be greater than or equal to about 3%, optionally greater than or equal to about 10%, optionally about 20%. In certain other variations, a connecting rod may be formed from lighter metals such as titanium or aluminum. The use of either titanium or aluminum results in about a 30% mass reduction when compared to the use of steel. By way of non-limiting example, other suitable metal-based materials include magnesium alloys, titanium and titanium alloys, high entropy alloys, cobalt-chromium alloys, nickel alloys, and stainless steels, iron-aluminum-silicon intermetallics. Metal matrix composites or non-metallic materials like carbon-fiber composites may also be used. The lattice structure may be formed from the same material as the peripheral wall.

Connecting rods having hollow or lattice structures as described above can be formed by additive manufacturing techniques. Indeed, additive manufacturing is particularly suitable for forming connecting rods having complex geometries. Thus, connecting rods formed by additive manufacturing can have highly complex and freeform shapes. For example, geometries can include curvature, internal voids or hollow regions, channels, passages, and holes. Furthermore, properties such as density (void space), weight, strength, stiffness, deflection levels, and material can be varied throughout the connecting rod.

While these features are readily created with additive manufacturing techniques, other manufacturing techniques are contemplated within the scope of the present disclosure. A person skilled in the art will recognize that certain aspects of the present disclosure can be formed by investment casting, metal injecting molding, hydroforming, and weldment, by way of non-limiting example.

Certain non-limiting advantages of connecting rods incorporating hollow or lattice regions are that they can be designed to have a high strength and stiffness and a relatively low mass compared to solid connecting rods. Connecting rods formed via additive manufacturing can be an integrally formed, single piece, unitary monolithic structure. Additive manufacturing processes enable a high degree of control over localized stiffness and deflection level levels within a connecting rod. Thus, as described in greater detail below, connecting rods formed via additive manufacturing may have a relatively high stiffness and a relatively low mass when compared to solid connecting rods.

In various aspects, the present disclosure provides connecting rods having relatively low mass and high stiffness when compared to connecting rods having solid I-beam arm constructions. FIG. 6 shows a connecting rod 270 having first and second ends 272, 274 and a length 275. The connecting rod 270 is fixed at its second end 274. The connecting rod 270 exhibits displacement 276 response to a load or force 278 applied to the first end 272. The displacement 276 is inversely proportional to stiffness. Thus, a low displacement corresponds to a high stiffness and a high deflection corresponds to a low stiffness.

Referring to FIGS. 7A-7E various non-limiting arm cross sections are shown. The cross sections in FIGS. 7A-7E have identical areas. FIG. 7A depicts an arm 310 having an I-shaped cross section. Stiffness data from the arm 310 is used as a baseline to compare stiffness of the other geometries shown in FIGS. 7B-7E. The arm 310 has a height 312 and a width 316. The arm 310 has a first thickness 320 and a second thickness 322. A first direction force 324 is applied in the direction of the width 316. A second direction force 326 is applied in the direction of the height. A torque 328 is applied as shown. The width may be 25 mm and the height may be 15 mm, by way of non-limiting example. The first thickness may be 2 mm and the second thickness may be 4 mm, by way of non-limiting example. Thus, the arm 310 may have a cross sectional area of 144 mm².

The arms shown in FIGS. 7B-7E have identical heights, widths, and cross sectional areas as the height 312, width 316, and cross sectional area of the arm 310 of FIG. 7A.

Similarly, the first direction force, second direction force, and torque are the same as the first direction force 324, second direction force 326, and torque 328 applied in FIG. 7A.

FIG. 7B depicts an arm 340 having a rectangular cross section and a uniform wall thickness 342. The wall thickness 342 may be 2 mm. FIG. 7C depicts an arm 350 having a rectangular cross section. The cross section includes side walls 352 that are thicker than top and bottom walls 354. The arm 350 has a first, top, or bottom wall thickness 356 of 1 mm and a second or side wall thickness 358 of approximately 2.48 mm. FIG. 7D depicts an arm 360 having a rectangular cross section. The cross section includes top and bottom walls 362 that are thicker than side walls 364. The arm 360 has a first wall thickness 366 of approximately 3.62 mm and a second wall thickness 388 of 1 mm. FIG. 7E depicts an arm 370 having an octagonal cross section at the inner surface. The arm 370 may have a wall thickness 372 of 1 mm at its thinnest points.

Deflection in first and second directs, and torsion of each of the cross sections of FIGS. 7A-7E is shown in Table 1 below. The cross sections of FIGS. 7B-7C and 7E each have a smaller first direction deflection than the cross section of FIG. 7A. All of the cross sections in FIGS. 7B-7E have improved second direction deflection and torsion when compared to FIG. 7A. Stiffness is inversely related to deflection. Thus, the cross sections showing a decrease in deflection exhibit improved stiffness. Connecting rods according to certain aspects of the present disclosure may therefore have tailored stiffness enabled by the cross section geometry.

TABLE 1

| Geometry | First Direction Deflection | Section Direction Deflection | Torsion |
| --- | --- | --- | --- |
| FIG. 7A | 100% | 100% | 100% |
| FIG. 7B | 99% | 51% | 11% |
| FIG. 7C | 93% | 59% | 19% |
| FIG. 7D | 116% | 45% | 13% |
| FIG. 7E | 93% | 48% | 13% |

Although the various wall structures shown in FIGS. 7B-7E include a hollow interior region, they may also be provided with a lattice structure in the interior region as shown in FIGS. 3A-3B. As generally understood by those of skill in the art, the design of the lattice structures can be varied depending upon the application. Specifically, the directionality of the mechanical stress is an important consideration. For example, one lattice structure optimal for reducing mechanical stress or load transfer in the plane of the component may require a different structure if the stress or load was primarily traveling in a direction normal to the component. The direction, distribution, and amount of mechanical stress applied will dictate the type of lattice structure that is optimal. Strength (e.g., resistance to torsion, tension, bending, and the like) will generally be dependent upon the orientation of the lattice relative to the direction of stress. That is, in some cases it is desirable to orient the latticework so that during deflection, the lattice is stressed in compression, which will tend to maximize the strength of the component. In other cases the reverse may be the goal, whereby more deflection is desirable (and thus less component strength). Thus, lattice structure design may be can be optimized to improve strength and stiffness of a connecting rod.

In various aspects, connecting rods according to the present disclosure exhibit increases stiffness and decreased mass when compared to connecting rods having a solid arm construction. Thus connecting rods according to the present disclosure may also have higher stiffness to mass ratios. The mass is the mass of the entire connecting rod.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A connecting rod for an internal combustion engine, the connecting rod comprising:
   a first end configured to be pivotally connected to a piston;
   a second end configured to be pivotally connected to a crankshaft; and
   an arm extending between the first end and the second end, the arm comprising:
      a peripheral wall having an outer surface, an inner surface, and an interior region defined by the inner surface, the interior region comprising at least one void space, wherein the void space is a lattice structure or a hollow region, wherein the inner surface defines a channel having one of: a triangular cross section, a trapezoidal cross section, a pentagonal cross section, a hexagonal cross section, a heptagonal cross section, an octagonal cross section, a nonagonal cross section, or a decagonal cross section.

2. The connecting rod of claim 1, wherein the void space comprises a lattice structure comprising a plurality of cells formed via additive manufacturing, casting, or weldment.

3. The connecting rod of claim 1, wherein the outer surface has a substantially rectangular cross section.

4. The connecting rod of claim 3, wherein the substantially rectangular cross section defines rounded corners.

5. The connecting rod of claim 1, wherein the arm defines one or more apertures.

6. The connecting rod of claim 1, wherein the arm further comprises:
   a first portion adjacent to the first end, the first portion defining a substantially uniform first width; and
   a second portion adjacent to the second end, the second portion defining the first width adjacent to the first portion of the arm and a second width greater than the first width adjacent to the second end of the connecting rod, wherein a width of the second portion increases between the first width and the second width.

7. The connecting rod of claim 6, wherein the second width is greater than or equal to about 2 times the first width and less than or equal to about 5 times the first width.

8. The connecting rod of claim 1, wherein the connecting rod has a tensile strength of greater than or equal to about 150 MPa.

9. The connecting rod of claim 2, wherein the lattice structure defines a first density in a first region and a second density distinct from the first density in a second region.

10. The connecting rod of claim 1, wherein:
    the inner surface is a first inner surface and the channel is a first channel; and
    the peripheral wall further comprises a second inner surface defining a second channel.

11. The connecting rod of claim 1, wherein the peripheral wall defines a thickness of greater than or equal to about 0.5 millimeters to less than or equal to about 3 millimeters.

12. The connecting rod of claim 1, wherein the arm is formed from or includes a metal selected from the group consisting of: aluminum, aluminum alloys, titanium, titanium alloys, and combinations thereof.

13. The connecting rod of claim 1, wherein the arm defines a first stiffness in a first region and a second stiffness in a second region, the second stiffness being distinct from the first stiffness.

14. A connecting rod for an internal combustion engine, the connecting rod comprising:
    a first end configured to be pivotally connected to a piston;
    a second end configured to be pivotally connected to a crankshaft; and
    an arm extending between the first end and the second end, the arm comprising:
       a peripheral wall having an outer surface, an inner surface, and an interior region defined by the inner surface, the interior region comprising at least one void space, wherein the void space is a lattice structure or a hollow region, wherein the inner surface defines a channel defining an octagonal cross section having eight (8) faces.

15. The connecting rod of claim 14, wherein the connecting rod has a tensile strength of greater than or equal to about 150 MPa.

16. The connecting rod of claim 14, wherein the peripheral wall defines a thickness of greater than or equal to about 0.5 millimeters to less than or equal to about 3 millimeters.

17. The connecting rod of claim 14, wherein the arm is formed from or includes a metal selected from the group consisting of: aluminum, aluminum alloys, titanium, titanium alloys, and combinations thereof.

18. The connecting rod of claim 14, wherein the outer surface has a substantially rectangular cross section.

19. The connecting rod of claim 18, wherein the substantially rectangular cross section defines rounded corners.

* * * * *